United States Patent
Foppe

(10) Patent No.: US 8,151,976 B2
(45) Date of Patent: Apr. 10, 2012

(54) DEVICE FOR TRANSPORTING AND SHAKING BLANKS

(75) Inventor: Norbert Foppe, Spelle (DE)

(73) Assignee: Rekers GmbH Maschinen- und Anlagenbau, Spelle (DE)

( * ) Notice: Subject to any disclaimer, the term of this patent is extended or adjusted under 35 U.S.C. 154(b) by 363 days.

(21) Appl. No.: 12/594,345

(22) PCT Filed: Mar. 28, 2008

(86) PCT No.: PCT/EP2008/002495
§ 371 (c)(1),
(2), (4) Date: Oct. 2, 2009

(87) PCT Pub. No.: WO2008/122376
PCT Pub. Date: Oct. 16, 2008

(65) Prior Publication Data
US 2010/0133068 A1 Jun. 3, 2010

(30) Foreign Application Priority Data
Apr. 5, 2007 (DE) .................. 10 2007 016 803

(51) Int. Cl.
*B65G 37/00* (2006.01)
(52) U.S. Cl. .................. 198/774.1; 198/463.3
(58) Field of Classification Search .............. 198/463.3, 198/750.14, 773–774.2, 577
See application file for complete search history.

(56) References Cited

U.S. PATENT DOCUMENTS

| | | | |
|---|---|---|---|
| 2,719,346 A | 10/1955 | Caciagli | |
| 6,145,648 A * | 11/2000 | Teichman et al. | 198/468.6 |
| 6,223,885 B1 * | 5/2001 | Markiewicz | 198/463.3 |
| 6,415,904 B1 * | 7/2002 | Markiewicz | 198/463.3 |
| 6,637,586 B1 * | 10/2003 | Kuecker et al. | 198/774.2 |
| 7,284,651 B2 * | 10/2007 | Heinemeier et al. | 198/345.3 |
| 2008/0164123 A1 * | 7/2008 | Noe et al. | 198/463.3 |
| 2010/0276251 A1 * | 11/2010 | Huang | 198/463.3 |

FOREIGN PATENT DOCUMENTS

| | | |
|---|---|---|
| DE | 945 825 | 7/1956 |
| DE | 1 900 544 | 9/1964 |
| DE | 69 11 956 | 7/1969 |
| DE | 198 13 868 | 9/1999 |

* cited by examiner

*Primary Examiner* — Mark A Deuble
(74) *Attorney, Agent, or Firm* — Gudrun E. Huckett

(57) ABSTRACT

A device for transporting and shaking blanks supported on pallets has a shaking station with a shaking table, a feeding conveyor upstream of the shaking station in a transport direction of the blanks, and a discharge conveyor downstream of the shaking station in the transport direction of the blanks. The feeding and discharge conveyors each have a liftable and lowerable transport frame and a drive. The transport frames are movable back and forth by the drive for transporting the pallets. The drives are adjustable to an identical intermittent transport distance and an intermittent transport distance in a ratio of 2:1. On the transport frame of the discharge conveyor a support is provided in an area adjacent to the shaking station. The support raises the discharge conveyor's receiving surface for the pallets and has a receiving surface aligned approximately with a table top of the shaking table.

20 Claims, 6 Drawing Sheets

A-A

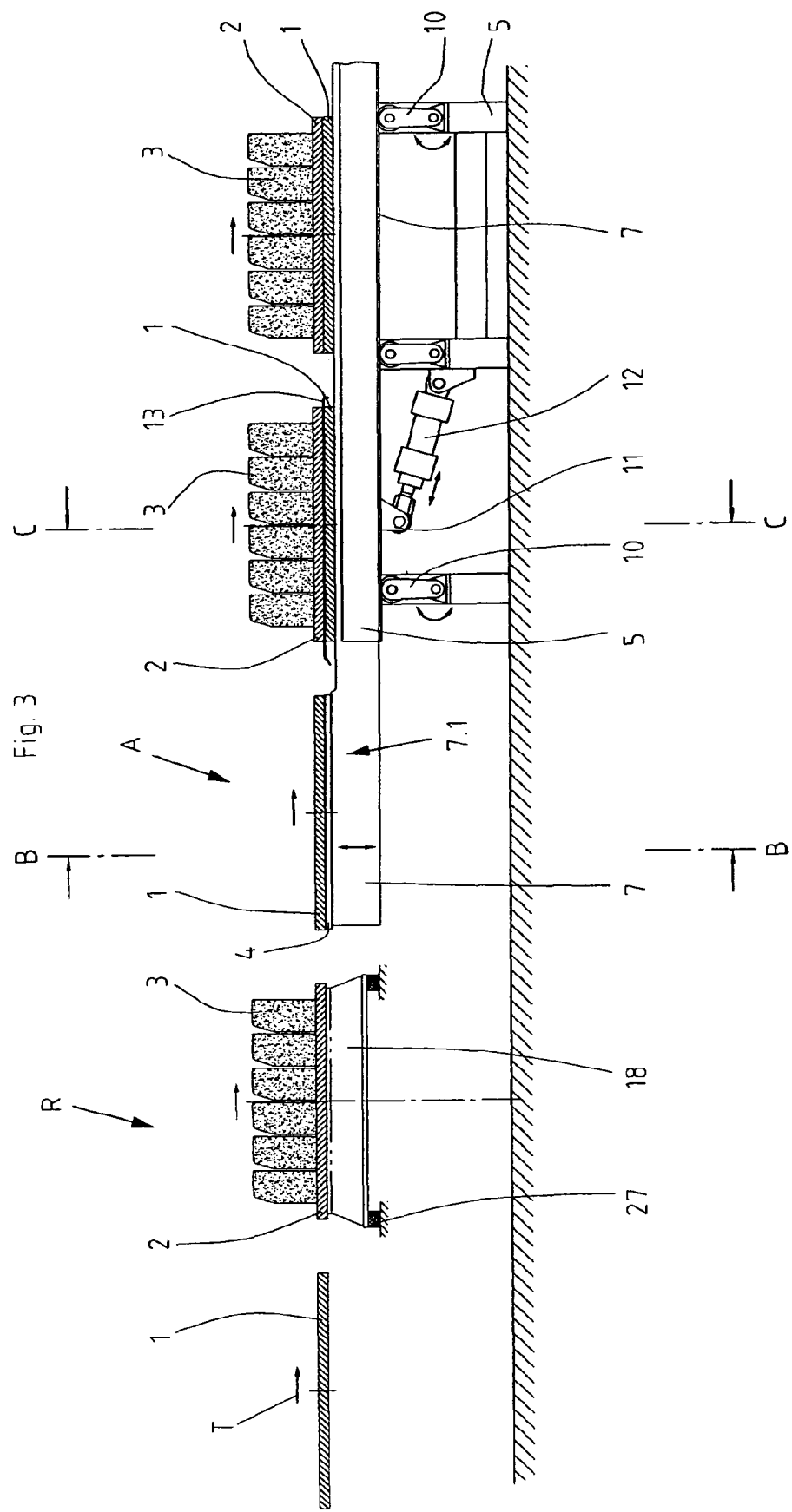

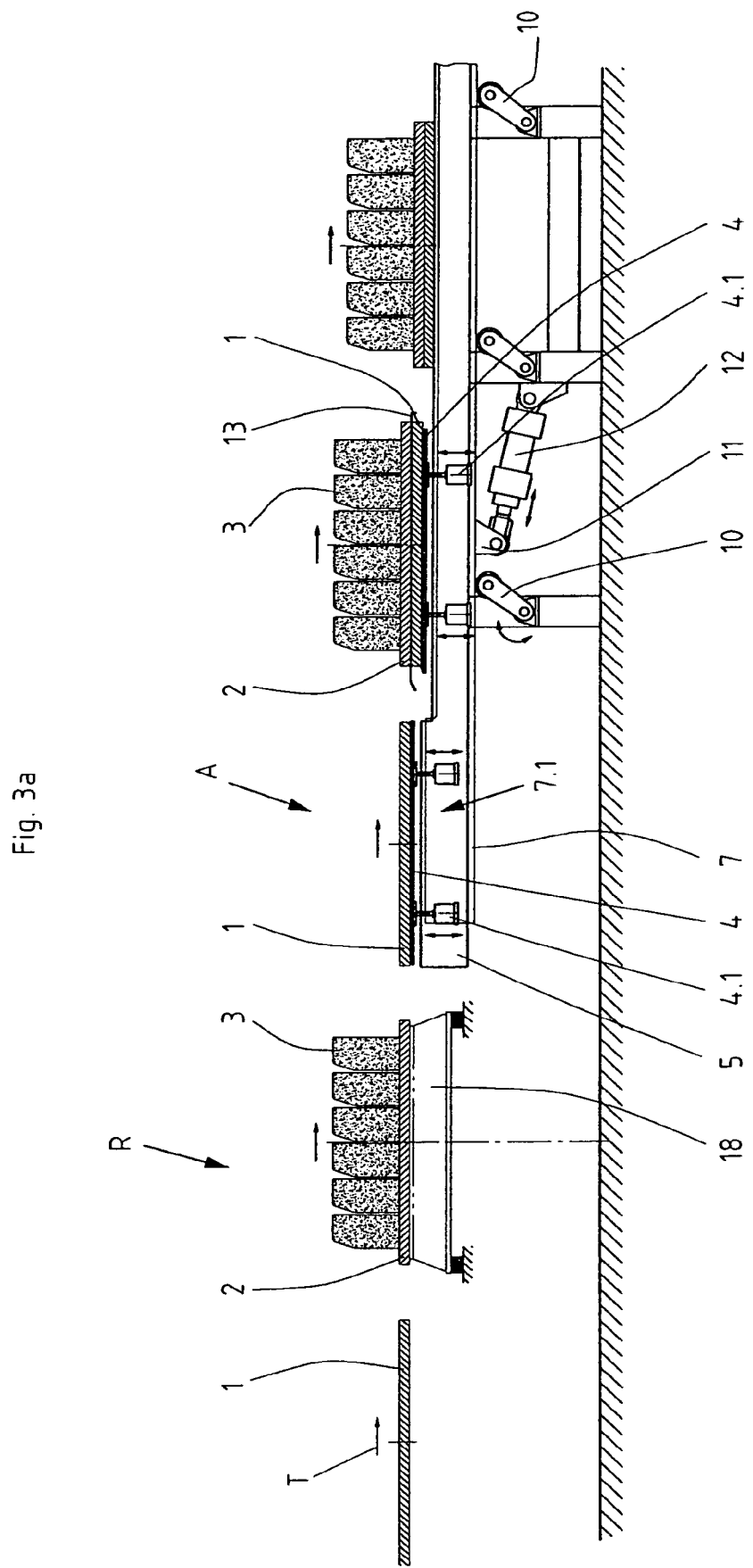

B-B

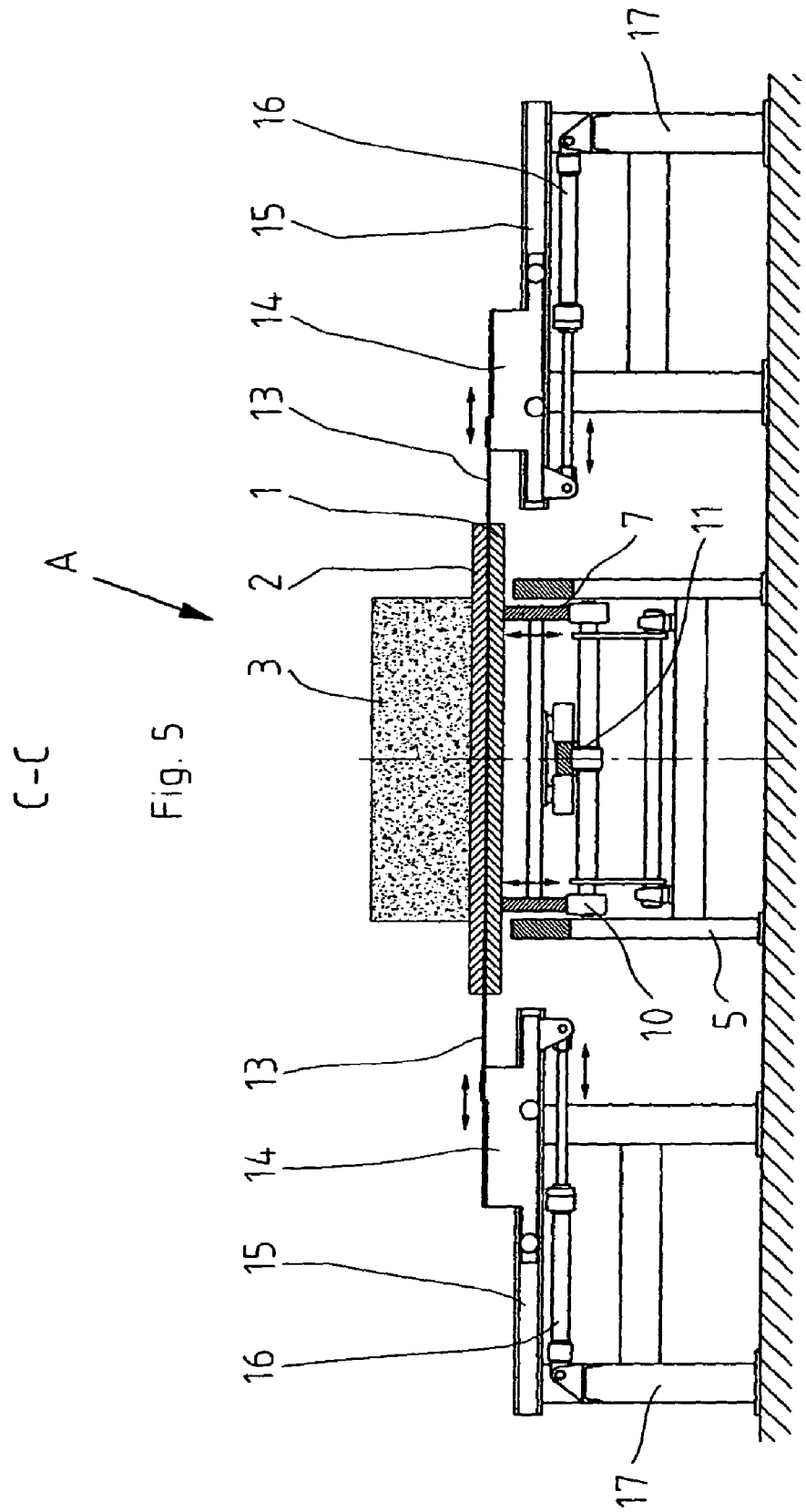

DEVICE FOR TRANSPORTING AND SHAKING BLANKS

BACKGROUND OF THE INVENTION

The invention relates to a device for transporting and shaking blanks, in particular of stone blanks, supported on pallets or similar support bodies, comprising a shaking station with a shaking table, comprising a feeding conveyor arranged upstream of the shaking station in the transport direction of the blanks, and a discharge conveyor arranged downstream of the shaking station in the transport direction of the blanks, wherein the feeding conveyor and the discharge conveyor each have a liftable and lowerable transport frame each movable back and forth by a drive in a translatory fashion for transporting the pallets.

Devices of the aforementioned kind of a conventional configuration have transport frames, feeding conveyors and discharge conveyors that, in the area of the shaking table, are responsible for the transport of the pallets to the shaking table (feeding conveyor) and the further transport of the still wet but already shaken blanks to further manufacturing steps and storage. In this connection, a predetermined number of pallets that are correlated with the manufacture must be transported. The transport frames are moved back and forth by a drive in such a way that they are moved by a certain intermittent transport distance in the transport direction of the blanks, are then lowered for a return transport movement opposite to the transport direction of the blanks, and then, in a subsequent movement in the transport direction, can lift the pallets again and transport them farther relative to a static frame. Such a device has correlated therewith a certain number of pallets. The intermittent transport distances of the transport frames that are being moved back and forth of the feeding conveyor as well as of the discharge conveyor are identical in order to be able to transport and shake continuously.

However, in many applications the number of pallets assigned to the device is too large so that, for example, only every other pallet is loaded with blanks. This has the result in conventional devices that the future empty pallets must be removed from the system and must be intermittently stored for future use. However, the correlated expenditure is great. When in conventional devices this expenditure is saved, half of the transported pallets must be entrained empty and transported to the associated storage locations. This unnecessarily ties up storage capacity.

It is an object of the present invention to further develop a device of the aforementioned kind for transporting and shaking blanks supported on pallets or similar support bodies in such a way that pallets that are not needed are handled in such a way that they can be positioned underneath another loaded pallet without there being the risk of damaging the blanks supported on this pallet.

SUMMARY OF THE INVENTION

For solving this object, the device of the aforementioned kind is characterized in that the drives of the transport frames of the feeding conveyor and of the discharge conveyor are adjustable to an identical intermittent transport frame distance and an intermittent transport frame distance in a ratio of 2:1 relative to one another and that on the transport frame of the discharge conveyor in areas adjacent to the shaking station a support can be provided that raises the discharge conveyor's receiving surface for a pallet and has a support height that is aligned approximately with the table top surface of the shaking table of the shaking station.

In this way, a device for transporting and shaking of blanks supported on pallets or similar support bodies is provided with which, with great safety in regard to damage of the blanks, an empty pallet can be pushed underneath a pallet that is loaded with blanks. When the loaded pallet is pushed onto an empty pallet in the area of the discharge conveyor, no unnecessary capacity is tied up in future storage. Upon further advancing movement there is the additional advantage that the blanks are carried by two pallets so that also, in case of lifting, the bending tendency of these pallets is reduced. In this way, the risk of hairline fracture formation in the blanks is reduced. It is also important that, because of the support, such a level of the receiving surface can be adjusted at the support frame of the discharge conveyor that the receiving surface of the support frame of the discharge conveyor is aligned with the table top surface of the shaking table. The adjoining receiving surface of the support frame of the discharge conveyor is provided with a reduced height that is selected based on the height of a pallet and a draw plate that possibly is to be arranged on a lower pallet; selection is such that the height of a lower pallet with draw plate arranged thereon, or even without draw plate, is substantially aligned with the support so that it is ensured that without any height differences a pallet can be pushed onto another in the area of the discharge conveyor.

In order to ensure that a continuous operation is possible even for the desired doubling of the pallets, the drives of the transport frame of the feeding conveyor and the drive of the transport frame of the discharge conveyor are designed to be adjustable in such a way that in case of doubling of the pallets relative to one another an intermittent transport distance in a ratio of 2:1 can be adjusted. This means that in the transport direction the transport frame of the feeding conveyor performs a translatory movement that is oriented in the transport direction and is twice as large as a transport movement oriented in the same direction of the transport frame of the discharge conveyor. In practice, for example, an intermittent transport distance of 2,700 mm movement length in the direction of the shaking table of the shaking station of the support frame of the feeding conveyor is adjusted while the support frame of the discharge conveyor for such a cycle has only a movement length and thus an intermittent transport distance of 1,350 mm.

When the device is to be operated such that the pallets are not doubled, the support is to be removed and in particular to be added to the transport frame of the discharge conveyor in the subsequent position to the static frame or it can be lowered in another embodiment variant so that for the transport frame of the discharge conveyor with regard to the height again a level can be adjusted that takes into consideration that each pallet is to be loaded with blanks. The intermittent transport distances of the transport frames of the feeding conveyor and of the discharge conveyor are then adjusted by means of the drives such that they correspond to one another and are, for example, 1,350 mm.

BRIEF DESCRIPTION OF THE DRAWINGS

With regard to further advantageous embodiments, reference is being had to further dependent claims, the following description, and the drawing. The drawing shows in:

FIG. 3 a schematic embodiment of the discharge conveyor A in a side view;

FIG. 3a an illustration in analogy to FIG. 3 of an alternative embodiment;

FIG. 5 a view according to the line C-C in FIG. 3.

DESCRIPTION OF PREFERRED EMBODIMENTS

Figure 1:
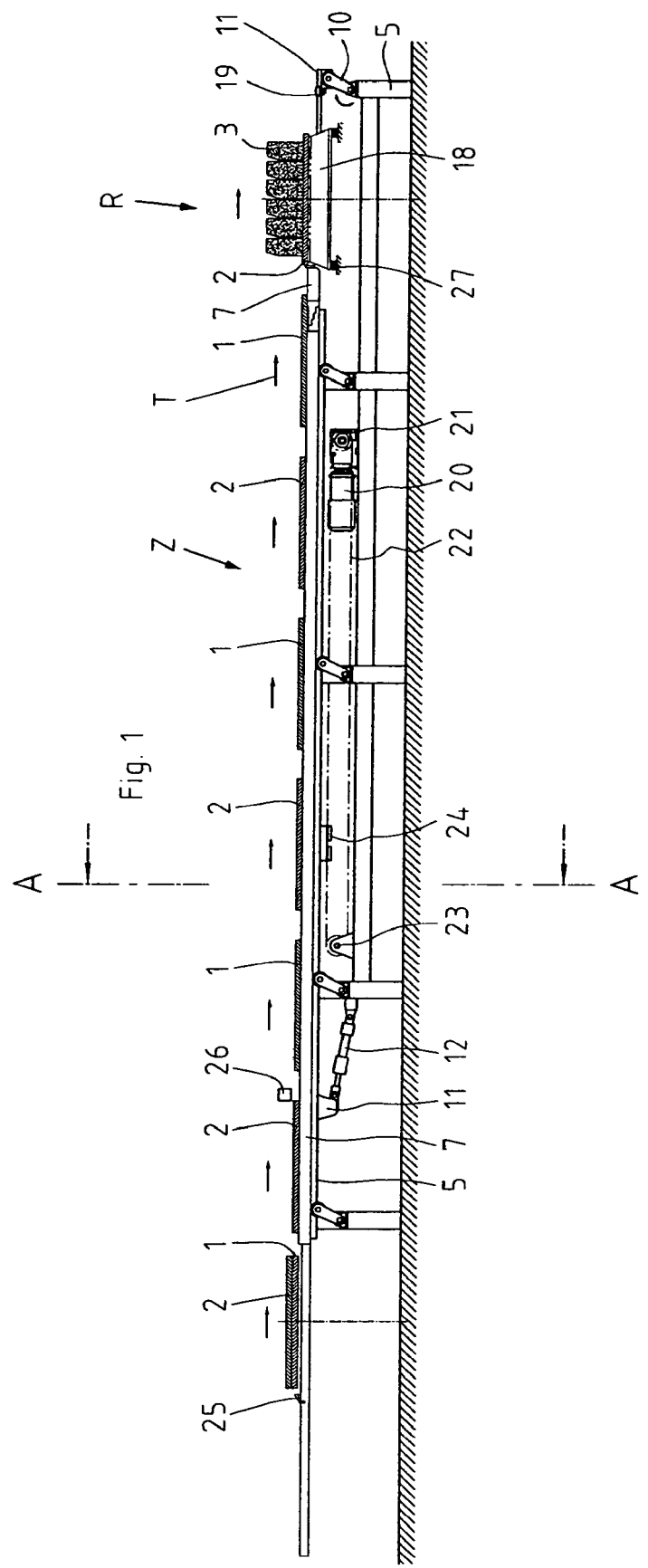
FIG. 1 a side view of an embodiment of a device for transporting and shaking the blank on pallets.
Figure 2:
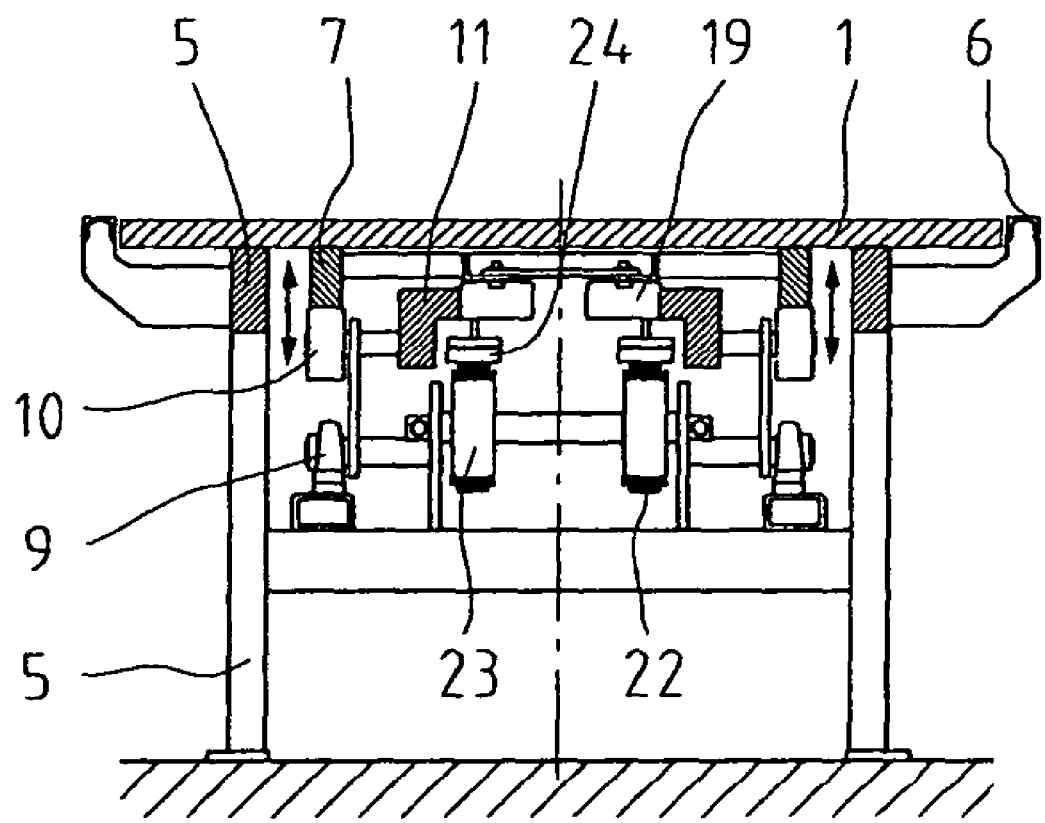
FIG. 2 a view according to section line A-A in FIG. 1.
Figure 4:
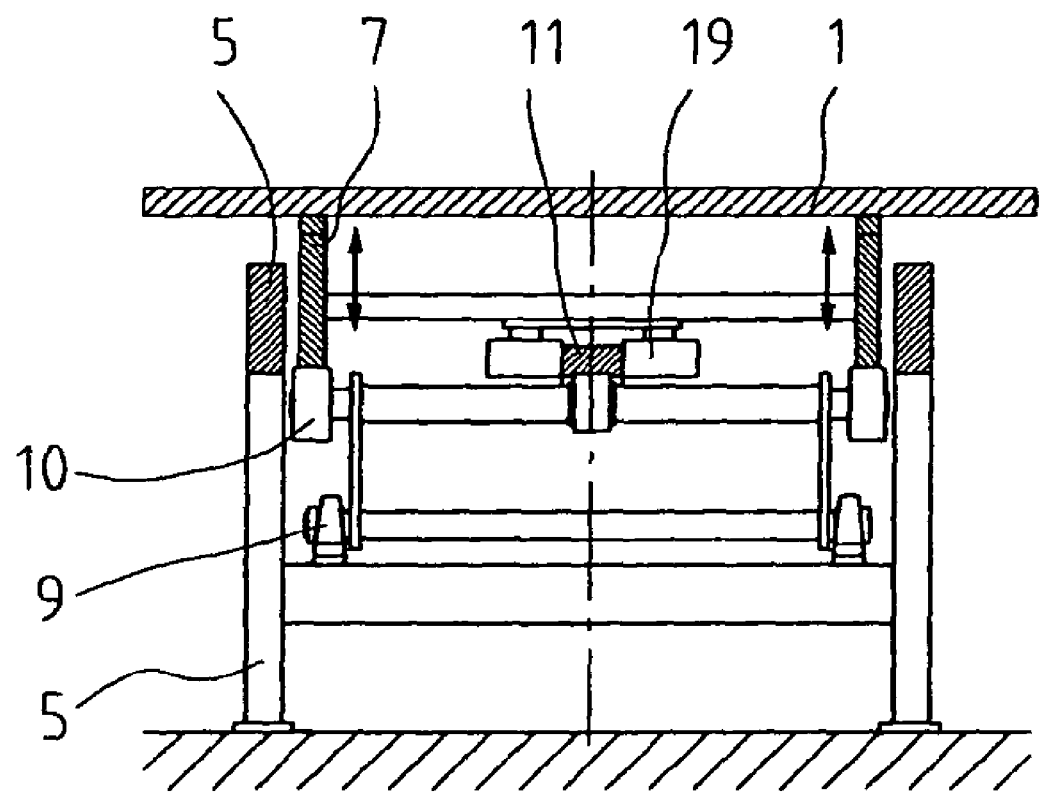
FIG. 4 a view according to section line B-B in FIG. 3.

FIG. 1 shows the device in the area of the feeding conveyor Z that is arranged in the transport direction upstream of the shaking station R. The feeding conveyor Z has a frame 5 (FIG. 2) on which pallet guides 6 are arranged that delimit the pallets 1 and 2 at their lateral edges at a spacing thereto. The frame 5 extends on both sides below the pallet 1 or 2. In addition to this frame a transport frame 7 is provided on both sides. This transport frame 7 is driven by means of a drive 20 and a drive belt 22 guided across a drive pulley 21 by means of the attachment 24 in such a way that it is moved back and forth. For this purpose, a further deflection pulley 23 is provided. In order to realize the translatory back and forth movement, lifting arms 10 are provided that each carry at the upper end a roller that is forced from below against the transport frame 7. The oppositely positioned lifting arms 10 are connected to one another by a tie rod 11 wherein by means of a lifting cylinder 12 (FIG. 1) this lifting rod is to be actuated for the purpose of adjusting the corresponding lifting arms. By means of the lifting arms 10 the transport frame 7 can be lifted and can then be moved relative to the frame 5 in transport direction until a corresponding pallet 1 or 2 can be placed onto the shaking table 18 that is supported at 27. The length of the advancing movement during one cycle, i.e., the forward movement in transport direction T of the device, is referred to in the following as intermittent transport distance and is adjustable by means of motor 20. This is an intermittent transport distance with which a pallet can be placed onto the shaking table 18 from its prior positioning as a pallet upstream of the shaking table 18. The transport frame has at its leading end a projecting plate with which a pallet can be pushed off the shaking table. For this purpose, the shaking table 18 is provided with corresponding openings that can be penetrated by the parts of the transport frame 7 so that a finish-shaken pallet 1 or 2 with the blanks 3 is pushed during a transport movement of the transport frame 7 off the shaking table and is transferred onto the discharge conveyor (A) arranged downstream and to be explained in the following in more detail. At the front end of the support frame 7 a guide roller 19 is provided and in the rear area there is a catch 25 and a pallet stop 26. By means of this pallet stop 26 stacked (doubled pallets) can be separated from one another such that the stacked pallets 1 and 2 (shown to the left in FIG. 1) are again individualized. In the illustrated embodiment, the intermittent transport distance of the feeding conveyor Z shall be adjusted to 2,700 mm.

FIG. 3 and FIG. 3a show embodiments of a conveyor A of the device according to the invention. The parts that are acting in the same way are identified by same reference numerals as in the feeding conveyor Z. In the front area of the discharge conveyor A a pallet 2 is pushed onto the pallet 1 that is not loaded with blanks 3. In order to be able to realize this continuously without interruption and without lifting of a pallet, the present invention has provided measures with which the pallet 2 provided with blanks 3 is pushed in continuous operation onto the pallet 1 without being lifted. Lifting could cause e.g. hairline fractures in the blanks 3 since they are still in the wet state, which leads to severe quality losses of the finished stones. In other regards, the support frame 7 is moveable up and down by means of arms 10, the lifting or pressure cylinders 12, and a tie or pull rod 11. Moreover, the static frame 5 is provided on which the pallets are to be deposited when the support frame 7 is lowered and returned into its initial position for a subsequent transport stroke. In the position of the lifting arms 10 shown in FIG. 3, the transport frame 7 is lifted into its highest position (12 o'clock positioned of the lifting arms 10).

In FIG. 3a, on the other hand, it is indicated that the transport frame 7 has been lowered (2 o'clock position of the lifting arms 10). Not illustrated in detail are the parts of the feeding conveyor that penetrate the shaking table 18 and that push the blanks processed on the shaking table or an empty pallet 1 into a position that is within the area 7.1 adjacent to the shaking table 18. This is the pallet 1 at the beginning of the stretch of the discharge conveyor A. The transport frame 7 is provided in this area adjacent to the shaking table 18 with a support 4 in the shape of a glide rail (FIG. 3) or a support 4 with lifting cylinders 4.1 provided underneath (FIG. 3a). This support 4 or the support together with the lifting cylinders 4.1 is designed or adjusted such that the receiving level is aligned with the level of the table of the shaking table 18 so that the pallet 2, illustrated on the shaking table in the illustrations, with a subsequent pushing-out movement of the feeding conveyor Z is moved into this area 7.1; at the same time the pallet 1 that is located there is moved into the position that is adjacent in the transport direction and thus to the right in the drawing, where the drawing shows the second pallet. The subsequent stroke can then push the illustrated pallet 2 on the shaking table 18 past the support 4 of FIG. 3 or FIG. 3a directly onto the pallet 1 as a result of the height difference. Prior to this, by means of lateral feeding devices (FIG. 5) a draw plate 13 is to be inserted. The feeding device has a carriage 14, a guide 15, and a lifting cylinder 16 and is arranged on both sides of the discharge conveyor A.

The doubling of the pallets is extremely simple by means of the device according to the invention and can be done automatically in the shaking and transport process. The intermittent transport distance of the conveyor A is adjusted with the drive provided thereat to half the intermittent transport distance of the feeding conveyor, in the example to 1,350 mm. The intermittent transport distance of e.g. 1,350 mm is adjusted also at the feeding conveyor Z when all pallets 1, 2 are loaded with blanks 3.

What is claimed is:

1. A device for transporting and shaking blanks supported on pallets, the device comprising:

a shaking station provided with a shaking table;

a feeding conveyor arranged upstream of the shaking station in a transport direction of the blanks;

a discharge conveyor arranged in the transport direction of the blanks downstream of the shaking station;

wherein the feeding conveyor and the discharge conveyor each have a liftable and lowerable transport frame and a drive, wherein the transport frames each are movable translatorily back and forth by the drive, respectively, for further transport of the pallets;

wherein the drives are adjustable to an identical intermittent transport distance and an intermittent transport distance in a ratio of 2:1;

wherein on the transport frame of the discharge conveyor a support is provided in an area adjacent to the shaking station which support raises the discharge conveyor's receiving surface for the pallets and has a receiving surface that is aligned approximately with a table top surface of the shaking table.

2. The device according to claim 1, wherein the drive of the transport frame of the feeding conveyer is adjustable to an intermittent transport distance of 2,700 mm while the drive of the transport frame of the discharge conveyor is adjustable to an intermittent transport distance of 1,350 mm.

3. The device according to claim 1, wherein the support is demountably arranged on the transport frame of the discharge conveyor.

4. The device according to claim 3, wherein the support for the intermittent transport distance of 1,350 mm is mountable in a subsequent placement position for the pallets.

5. The device according to claim 1, wherein the support is of a two-part or multi-part configuration and comprises a lifting device.

6. The device according to claim 5, wherein the lifting device comprises lifting cylinders.

7. The device according to claim 1, wherein the transport frames of the feeding conveyor and of the discharge conveyor are driven by the drives continuously.

8. The device according to claim 1, wherein the transport frames of the feeding conveyor and of the discharge conveyor are driven by the drives independent from one another.

9. The device according to claim 1, wherein the transport frames of the feeding conveyor and of the discharge conveyor are driven by the drives continuously and independent from one another.

10. The device according to claim 1, wherein the transport frames of the feeding conveyor and of the discharge conveyor are lifted and lowered independent from one another.

11. The device according to claim 1, further comprising a static frame and lifting arms that are supported pivotably on the static frame.

12. The device according to claim 11, wherein the transport frame of the feeding conveyor is engaged by the lifting arms and lifted and lowered by the lifting arms.

13. The device according to claim 12, wherein the lifting arms each have a roller body engaging the transport frame of the feeding conveyor.

14. The device according to claim 11, wherein the transport frame of the discharge conveyor is engaged by the lifting arms and lifted and lowered by the lifting arms.

15. The device according to claim 14, wherein the lifting arms each have a roller body engaging the transport frame of the discharge conveyor.

16. The device according to claim 11, further comprising at least one lifting cylinder connected to the lifting arms, wherein the lifting arms are transferable by the at least one lifting cylinder into different pivot positions.

17. The device according to claim 1, further comprising at least one feeding device for intermediate arrangement of a draw plate between two pallets stacked on top one another, wherein the at least one feeding device is arranged at the discharge conveyor.

18. The device according to claim 17, wherein the at least one feeding device comprises a carriage, a carriage guide, and a lifting cylinder.

19. The device according to claim 1, further comprising a static frame disposed adjacent to the transport frames, respectively, wherein the pallets during a movement of the transport frames opposite to the transport direction of the pallets are deposited on the static frame.

20. The device according to claim 17, wherein the static frame comprises a pallet guide.

* * * * *